United States Patent [19]

Goelff et al.

[11] Patent Number: 5,434,006
[45] Date of Patent: Jul. 18, 1995

[54] FIRE-RESISTANT PANEL

[75] Inventors: Pierre Goelff, Nalinnes; Robert Vanderstukken, Ransart, both of Belgium; Roland Leroux, Stadecken-Elsheim, Germany; Thomas M. Karschti, Budenheim, Germany; Jürgen Thurk, Schornsheim, Germany

[73] Assignees: Glaverbel, Brussels, Belgium; Schott Glaswerke, Mainz, Germany

[21] Appl. No.: 232,420

[22] Filed: Apr. 25, 1994

Related U.S. Application Data

[63] Continuation of Ser. No. 901,221, Jun. 19, 1992, abandoned.

[30] Foreign Application Priority Data

Jun. 21, 1991 [GB] United Kingdom ............... 9113417

[51] Int. Cl.⁶ ............................................. B32B 17/06
[52] U.S. Cl. ........................... 428/428; 428/142; 428/172; 428/410; 428/446; 428/702; 428/913; 428/920; 428/921
[58] Field of Search ............... 428/913, 920, 921, 426, 428/428, 448, 688, 689, 702, 409, 410, 141, 142, 149, 172, 446

[56] References Cited

U.S. PATENT DOCUMENTS

| | | | |
|---|---|---|---|
| 4,444,825 | 4/1984 | Vanderstukken | 428/921 |
| 4,626,301 | 12/1986 | Nolte | 428/921 |
| 4,681,810 | 7/1987 | Gomez | 428/921 |
| 4,873,146 | 10/1989 | Toussaint | 428/921 |
| 4,935,281 | 6/1990 | Tolbert | 428/921 |

FOREIGN PATENT DOCUMENTS

| | | |
|---|---|---|
| 1596863 | 1/1972 | Germany . |
| 1151931 | 5/1969 | United Kingdom . |
| 2023452 | 1/1980 | United Kingdom . |
| 1590387 | 6/1981 | United Kingdom . |
| 2096944 | 10/1982 | United Kingdom . |
| 2188925 | 10/1987 | United Kingdom . |

OTHER PUBLICATIONS

Chemical Abstracts, vol. 85, No. 14, Oct. 4th, 1976, Columbus OH; abstract No. 98362x; Jenaer Glaswerk Schott und Gen "Flame and high temperature . . . ", p. 267.

*Primary Examiner*—Archene Turner
*Assistant Examiner*—Timothy M. Speer
*Attorney, Agent, or Firm*—Spencer, Frank & Schneider

[57] ABSTRACT

A glazing panel which is transparent and fire-resistant, including at least one vitreous structural ply including at least one rough-faced ply composed of vitreous material having a mean coefficient of linear thermal expansion over a temperature range of 20° C. to 300° C. which is not greater than $7.5 \times 10^{-6} K^{-1}$ and having a rough face for which roughness, $R_{tm}$, is not less than 0.1 μm; and at least one layer of intumescent material directly bonded to and in contact with the rough face of the at least one rough-faced ply.

16 Claims, 1 Drawing Sheet

FIRE-RESISTANT PANEL

This application is a Continuation of application Ser. No. 07/901,221, filed Jun. 19, 1992, now abandoned.

BACKGROUND OF THE INVENTION

1. Field of the invention

This invention relates to a transparent, fire-resistant, glazing panel comprising at least one layer of intumescent material bonded to at least one structural ply of the panel. The invention extends to a method of manufacturing a transparent fire-resistant glazing panel comprising forming a sandwich assembly from a plurality of vitreous plies with successive vitreous plies in contact with an intervening layer of intumescent material and subjecting that sandwich to heat and pressure conditions such as to degas the inter-ply spaces of the sandwich and to cause the sandwich assembly to be bonded together as a transparent laminate.

2. Description of the Related Art

Layers of intumescent material are often associated with sheets of glazing material to form transparent, fire-resistant panels. For example such a layer may be sandwiched between two glass sheets. Very important uses of such panels are as screens which permit illumination of a screened area and as closures of viewing apertures of rooms or other enclosures where there may be a risk of fire.

Hydrated metal salts, for example metal silicates, especially alkali metal silicates have been used as intumescent materials in such panels for some years. On the outbreak of fire, the water of hydration is driven off by the heat of the fire, and the layer of intumescent material becomes converted to an opaque foam which serves as a barrier to both radiated and conducted heat.

It is also known that that layer may serve to bond together structural sheets of the panel such as sheets of glass which may become shattered by thermal shock due to the fire. The effectiveness of the panel as a barrier against the passage of fumes and flames is thus also prolonged to some extent, but it is soon destroyed after the last glass sheet of the panel breaks.

Typically, the effectiveness of such panels is tested by mounting them in a wall of a furnace whose interior temperature is then increased according to a pre-determined schedule.

Details of such a test are specified in International Standard No ISO 834-1975. The fire-resistance test procedure set out in that Standard is also referred to in International Standard ISO 9051-1990 which speaks specifically of the fire-resistance characteristics of glazed assemblies. It is appropriate to quote some passages from that latter Standard here.

"Glass is a non-combustible material and therefore will not contribute to or propagate fire.

"Glass if affected by heat may fracture by thermal shock or may soften and then not be held by the frame. Only certain types of glazed assemblies are, therefore, recognised as fire-resisting. The ability of glazed assemblies to resist fire depends on the type of glazed products, glazing method, frame type, pane size, fixing method and the type of construction surrounding the glazed area.

"Some transparent and translucent glazed assemblies can meet requirements for stability and integrity (RE), and in some cases insulation (REI, where R is for resistance, E for étanchéité and I for insulation).

"Not only is the possibility of direct fire propagation through openings caused by glass breakage to be considered for fire protection precautions: it may also be necessary to take into account the heat transmitted through the glazed assembly, which may still be intact, as such heat may cause ignition of combustible materials.

"Glazed assemblies of fire-resistance according to class RE under the fire conditions as defined in ISO 834 provide, for a given time, stability and integrity. The temperature of the unexposed side is not taken into account.

"Glazed assemblies of fire-resistance according to class REI under the fire conditions as defined in ISO 834 provide, for a given time, stability, integrity and insulation."

There are different grades of fire-screening panel, and among those commonly recognised are grades which correspond to panels which are effective against flames and fumes for periods of 15, 30, 45, 60, 90 and 120 minutes.

The insulation properties which a panel must afford in order to meet the standard to REI level are, briefly, that no point of the surface which is exposed to the exterior of the furnace may undergo an increase in temperature of more than 180° C. above its initial (ambient) temperature, and the mean temperature increase of that face must not exceed 140° C. Such panels belonging to class REI may also form barriers against the transmission of infra-red radiation from the seat of a fire.

When a panel incorporating an intumescent layer sandwiched between two sheets of glazing material is exposed to the outbreak of a fire, the intumescent material will be broken down and will expand into a mousse or foam. The glazing material may be softened under the heat evolved by the fire, or it may fracture due to thermal shock. It will be appreciated that the sheet of glazing material closest to the fire will be at greatest risk of fracture due to thermal shock, and accordingly various proposals have been made to reduce the tendency of that, or some other sheet, to fracture.

For example British Patent Specification No 2 096 944 proposes to make use of a sheet of a boro-silicate or other special vitreous material having a low coefficient of thermal expansion thus reducing the degree of thermal shock for a given temperature gradient in the sheet. It has also been proposed to make use of tempered glass which is in theory better able to withstand thermal shock. Increasing the thermal shock resistance of one or more of the sheets of the panel in either of those ways, especially if rather thick sheets are used, will afford some increase in fire-resistance. However, this will also add to the costs of manufacturing the panel, and it may also add to its weight.

If a sheet of the panel, for example the sheet closest to the fire, should become fractured, the foamed intumescent material will tend to displace the resulting fragments. While the foamed intumescent material tends to cling to any such fragments retaining them in position, this tendency is reduced as temperature is increased, and a displaced fragment may slide down the window tending to shear the foamed layer, dragging much of that foam with it and thus exposing the next structural ply of the panel to the full force of the fire. And so destruction of the integrity of the panel proceeds.

Clearly, the panel must maintain some sort of structural integrity if it is to remain effective as a barrier to flames, fumes and direct heat radiation. For that reason the practice has been adopted of increasing the number of layers of intumescent material and the number of the sheets of glazing material, of using thicker layers of intumescent material, and also of increasing the thicknesses of the glazing sheets in order that fragments may not be so easily displaced to fall.

Any such increase in the mass per unit area of the panel will give rise to certain additional costs, not only in materials, but also in storage, handling and transport. It will also result in the need for a significantly more robust and thus more expensive frame for installation in the structure where it is required. Increasing the thickness of a layer of intumescent material makes it more difficult to achieve a high degree of transparency.

SUMMARY OF THE INVENTION

The present invention aims to provide a panel having improved fire-resistance.

According to the present invention, there is provided a transparent, fire-resistant, glazing panel comprising at least one layer of intumescent material bonded to at least one structural ply of the panel, characterised in that such panel incorporates at least one ply of vitreous material having a mean coefficient of linear thermal expansion over a temperature range of 20° C. to 300° C. which is not greater than $7.5 \times 10^{-6} K^{-1}$, such ply (hereinafter called "the rough-faced ply") having a rough face (as herein defined) to which a said layer of intumescent material is directly bonded.

The expression "vitreous" is used herein to denote glass and vitro-crystalline materials. The expression "vitro-crystalline material" is used herein to denote a glass which has been subjected to a treatment to ensure controlled partial de-vitrification. Vitro-crystalline material is also often referred to as a vitro-ceramic or glass ceramic.

The roughness or rugosity of a sheet of vitreous material can be measured in various ways. For the purposes of this specification, we nominate a rugosimeter "Form Talysurf" from Taylor-Hobson used in "rugosity mode", that is to say set to eliminate surface irregularities having wavelengths greater than 0.8 mm so leaving only irregularities having shorter wavelengths (roughness or rugosity). The method used is that specified by the manufacturer of the rugosimeter, using a sampling length of 0.8 mm. The method is broadly similar to those specified in DIN 4768 and ISO 4288, but differs in particular in the way in which the results are presented.

Various results are obtained, including those which we designate as follows:

$R_{ti}$ the difference in height between the top of the highest peak and the bottom of the deepest valley in any given sampling length i. It may be noted that this is equivalent to $R_y$ as defined in ISO 4287.

$R_{tm}$ the mean of all values of $R_{ti}$ measured over the whole assessment length. It may be noted that this is equivalent to $R_{z\ DIN}$ as defined in DIN 4768.

For the purposes of this specification we define a rough vitreous surface as being one for which $R_{tm}$ is not less than 0.1 μm.

Conversely, a smooth vitro-crystalline surface is defined as one for which $R_{tm}$ is less than 0.06 μm.

By way of comparison, it may be of interest to note here that fire-polished float glass typically has $0.02\ \mu m < R_{tm} < 0.035\ \mu m$, that a typical matted glass made in accordance with British Patent Specification No 1,151,931 has $1.5\ \mu m < R_{tm} < 2.2\ \mu m$, and that a matted glass made in accordance with British Patent Specification No 2 188 925 may typically have $R_{tm} \cong 0.5\ \mu m$.

The use of a vitreous ply having a rough surface has a particularly important combination of advantages for the purposes in view. Firstly, such rough-faced ply has a lower coefficient of thermal expansion than that of ordinary window (soda-lime) glass, which is about $8.9 \times 10^{-6} K^{-1}$ over the temperature range 0° to 100° C., and accordingly, for a given thickness and a given temperature gradient it is less apt to break due to thermal shock. Secondly, the surface rugosity acts as a mechanical key which tends to promote the adherence of the intumescent material even after foaming and after another sheet of the panel, for example of glass, has become fractured and some fragments have been displaced. In the result, the rough-faced ply tends to remain intact for longer than an ordinary glass sheet, and it also tends to retain an overall screening layer of foamed intumescent material, and there is thus a synergistic effect leading to a longer conservation of the integrity of the panel as a barrier against flames and fumes, and also against the transmission of infra-red radiation. The thermal screen formed by the rough-faced sheet and its layer of foamed intumescent material prolongs the fire-resistance of the panel.

A panel according to the invention affords a marked improvement in fire-resistance and this enables a given grade of fire resistance to be achieved with a thinner and therefore lighter panel which is easier to store, transport and install in a frame, and it also enables thinner layers of intumescent material to be used (again for the same degree of fire-resistance) which is of considerable advantage in facilitating manufacture of panels having high transparency.

In the most preferred embodiments of panel according to this invention, the or each to said layer of intumescent material is sandwiched between and directly bonded to two vitreous plies. The adoption of this preferred feature of the invention promotes transparency of the panel.

The present invention extends to a method of manufacturing such a panel and accordingly there is provided a method of manufacturing a transparent fire-resistant glazing panel comprising forming a sandwich assembly from a plurality of vitreous plies with successive vitreous plies in contact with an intervening layer of intumescent material and subjecting that sandwich to heat and pressure conditions such as to degas the interply spaces of the sandwich and to cause the sandwich assembly to be bonded together as a transparent laminate, characterised in that at least one said vitreous ply is a ply of vitreous material having a mean coefficient of linear thermal expansion over a temperature range of 20° C. to 300° C. which is not greater than $7.5 \times 10^{-6} K^{-1}$, such ply (hereinafter called "the rough-faced ply") having a rough face (as herein defined) in contact with a said layer of intumescent material.

We have already referred to the advantages afforded by using a ply of vitreous material having a rough face in contact with a said layer of intumescent material on the outbreak of fire. The use of such a ply also confers rather unexpected advantages during such a manufacturing method. It might be thought that the use of such a ply would make degassing of the sandwich assembly more difficult because air would tend to become entrapped by its rough surface. Surprisingly, this is not so.

In fact it even appears that the surface rugosity may provide airways which actually facilitate the degassing step of the manufacturing process, with the result that any tendency for air to be entrapped between the plies of the panel is reduced and a better bond can be established between the rough-faced ply and the intumescent material. We have found that, under the heat and pressure conditions, the intumescent material substantially fills the valleys of the rough face so that such rough face has little or no deleterious effect on the transparency of the panel.

A further advantage of having direct bonding between the intumescent material and an adjacent vitreous ply is that it avoids the necessity for any intervening bonding material. This helps to avoid the addition of unnecessary manufacturing costs, and it helps to promote fire-resistance, since most of the adhesive materials conventionally used for laminating vitreous plies together, such as polyvinyl butyral, have rather low melting points and are thus easily destroyed during the course of a fire. If that should happen, their bonding effectiveness would be destroyed.

It would of course be possible for each vitreous ply of the panel to be a said rough-faced ply, but rough-faced material tends to be more costly than, for example, ordinary window glass, and perfectly satisfactory results can be given by a fire-resistant panel which incorporates but a single rough-faced ply. Preferred embodiments of the invention provide that the or at least one said intumescent layer is sandwiched between a said rough-faced ply and a glass ply.

In some preferred embodiments of the invention, said panel includes a said rough-faced ply which has two rough faces and which is sandwiched between and directly bonded to two layers of intumescent material. In this way, the advantage of retention of foamed intumescent material by the rough-faced ply is obtained at both faces of that ply.

In some preferred embodiments of the invention, said panel includes a said rough-faced ply which has an exposed face which is smooth. Such panels may for example be constituted by one rough-faced ply and one smooth-faced glass ply, for example an ordinary soda-lime glass ply, sandwiching a single layer of intumescent material to form a light-weight and effective fire-resistant panel. Alternatively one or more additional intumescent layers and vitreous plies may be incorporated. The smooth exposed face of the rough-faced ply tends to promote transparency of the panel.

Preferably, said rough-faced ply has a mean coefficient of linear thermal expansion over a temperature range of 20° C. to 300° C. which is not greater than $3.5 \times 10^{-6} K^{-1}$. The adoption of this preferred feature has the advantage of reducing the susceptibility of such ply to breakage due to thermal shock.

In the most preferred embodiments of the invention, at least said rough-faced ply is a ply of vitro-crystalline material.

Such vitro-crystalline plies are found to be highly resistant to thermal shock, and accordingly they retain their integrity for longer than glass, for a given thickness, when they are exposed to the effects of a fire. Vitro-crystalline materials also tend to have rather high softening and melting points. The use of a vitro-crystalline ply having a rough surface has particularly important advantages for the purposes in view, because it tends to increase the length of time for which a layer of the foamed intumescent material can remain disposed over the area of the panel even after another sheet of the panel has become fractured and some fragments have been displaced.

Certain vitro-crystalline materials can have an extremely low or a negative coefficient of thermal expansion, and for the best results it is preferred to select such a material so that said rough-faced ply has a mean coefficient of linear thermal expansion over a temperature range of 20° C. to 600° C. which is not greater than $1 \times 10^{-6} K^{-1}$.

The achievement of such low coefficients of expansion is at least in part determined by the structure of the crystalline phase of the vitro-crystalline material. It is preferred that the principal crystalline phase of the material of said rough-faced vitro-crystalline ply is a solid solution of $\beta$-quartz. The incorporation of such a principal crystalline phase in the vitro-crystalline material is of assistance in obtaining very low coefficients of expansion.

Advantageously, the material of said rough-faced vitro-crystalline ply contains $TiO_2$ and $ZrO_2$ as nucleating agents each in a proportion by weight of from 0.8% to 3.0%. This tends to promote the formation of a high quality vitro-crystalline material. It has been found that such proportions of such nucleating agents are high enough to obtain a high quality vitro-crystalline material after partial devitrification, while at the same time being low enough to substantially avoid nucleation during hot working of the material.

Such panels offer a further advantage. The preferred intumescent material for use in such panels comprises hydrated sodium silicate. This is for reasons of cost, ease of handling and formation into transparent inter-layers and effectiveness on the outbreak of fire. Intumescent layers of that material tend over the course of time to develop a population of micro-bubbles. This will cause a deterioration in the optical properties of the panel. We have found, rather to our surprise, that the presence of a vitro-crystalline ply tends to reduce the proliferation of such micro-bubbles. This is possibly because many vitro-crystalline materials absorb ultra-violet radiation.

In the most preferred embodiments of the invention, said panel includes a said ply of vitro-crystalline material which contains alkali metal atoms, at least the greater part by number of such atoms being lithium atoms. The use of a lithium-containing vitro-crystalline material affords a marked improvement in the fire-resistance of a panel according to this invention. The reason which this marked improvement should be evident is not wholly clear, but one possible reason is that under the heat of a fire, there is an inter-diffusion of lithium ions from the vitro-crystalline material and sodium ions from the intumescent material, this leading inter alia to the formation of lithium silicate over the surface of the vitro-crystalline material. Lithium silicate has better refractory properties than sodium silicate and so would be expected to remain in position for longer should a neighbouring structural ply of the panel become fragmented. But in any event, the advantages afforded are real, and they do not depend on this or any other theoretical explanation.

A further advantage is afforded by the use of a lithium-containing vitro-crystalline material which on the outbreak of fire acts to convert an adjacent hydrated sodium silicate layer at least in part to lithium silicate. This is that lithium silicate is much less soluble in water than is sodium silicate, so the resulting lithium silicate foam is much less likely to be washed away from the panel by the action of an automatic sprinkler system or indeed by spraying with a fire-hose.

Advantageously, said panel includes a said ply of vitro-crystalline material which is based on the ternary system $Li_2O$—$Al_2O_3$—$SiO_2$. We have found that such materials are especially suitable for the purposes in view. In particular, the new material formed on the outbreak of fire by the reaction of the sodium silicate and the $Li_2O$—$Al_2O_3$—$SiO_2$ system vitro-crystalline material possibly has a lamelloid structure with air or some other gas trapped within the interstices between the lamellae. Furthermore, we have also noted that fire-resistance is also enhanced by a proceeding slow crystallisation of a remaining vitreous phase of the vitro-crystalline material.

BRIEF DESCRIPTION OF THE DRAWINGS

Preferred embodiments of the invention will now be described in greater detail by way of example and with reference to the accompanying diagrammatic drawings in which.

DESCRIPTION OF THE PREFERRED EMBODIMENTS

Figure 1:
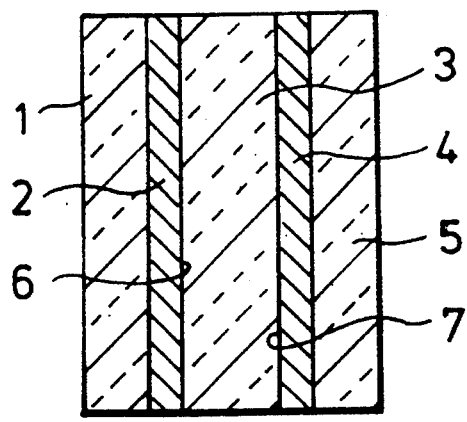
FIGS. 1 to 3 are detail, diagrammatic, cross-sectional views of three embodiments of fire-resistant glazing panel according to this invention.

In FIG. 1, a transparent, fire-resistant, glazing panel comprises in succession a first sheet of glass 1, a first layer of intumescent material 2, a sheet of rough-faced vitreous material 3, a second layer 4 of intumescent material, and a second sheet of glass 5.

The two major faces 6, 7 of the vitreous sheet 3 are rough, and the whole panel is bonded together as a laminate using the intumescent material of the layers 2, 4 as bonding material in direct contact with the respective vitreous sheets.

Figure 2:
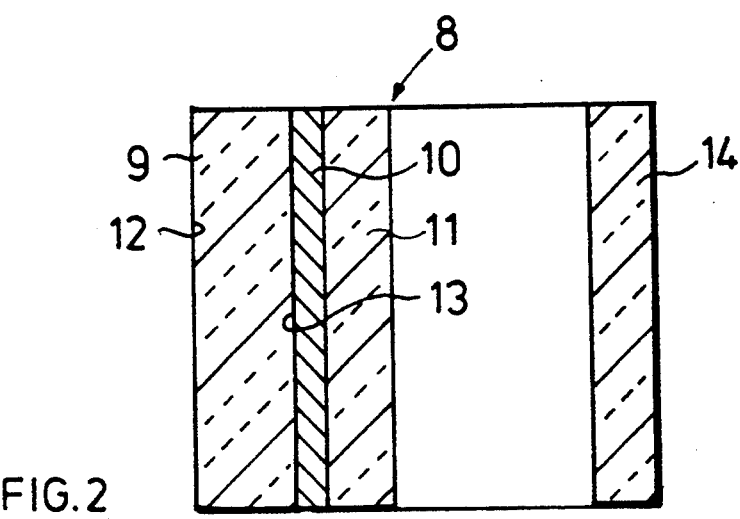

FIG. 2 shows a hollow glazing panel according to this invention comprising a first, laminated pane 8 itself constituted as a fire-resistant panel according to this invention which has a first, vitreous ply 9 directly bonded to a layer 10 of intumescent material which is in turn directly bonded to a glass sheet 11 to form the laminated pane 8. The face 12 of the vitreous sheet 9 which is exposed is smooth, while the face 13 which is in direct contact with the intumescent layer 10 is rough. The laminated pane 8 is held in a frame (not shown), in spaced relationship with a second pane constituted by a single ply or sheet 14 of glazing material.

In a first variant of the embodiment shown in FIG. 2, the laminated pane 8 constitutes the entirety of the fire-resistant panel. In a second variant, a second glass sheet (not shown) is laminated to the glass sheet 11 via a second layer of intumescent material (again, not shown).

Figure 3:
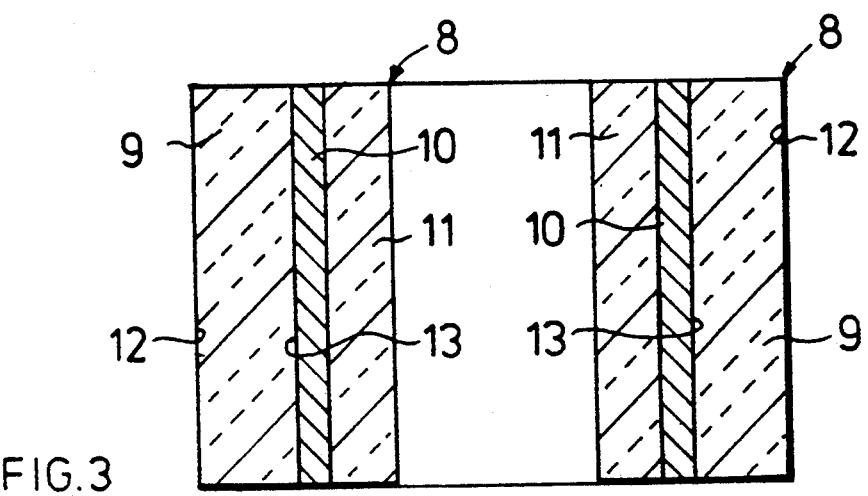

FIG. 3 shows a second hollow glazing panel according to this invention comprising a pair of laminated panes 8 (compare FIG. 2) which are held back-to-back in spaced relationship. Reference numerals used in FIG. 2 are also used in FIG. 3 to denote respectively analogous elements.

In the drawings, and in the Examples which follow, each vitreous sheet face which is exposed, that is to say each face which is not in contact with a layer of intumescent material, has a smooth, polished surface in order to limit diffusion of light at that surface and to allow a good resolution of objects viewed through the respective panel.

EXAMPLE 1 (FIG. 1)

A laminated, transparent, fire-resistant panel is manufactured in accordance with FIG. 1. The two glass sheets 1, 5 are each of ordinary soda-lime glass and each 3 mm in thickness. The two intumescent layers 2, 4 are each of hydrated sodium silicate and 1 mm in thickness. The sodium silicate used has a weight ratio $SiO_2$:$Na_2O$ of 3.4:1 and contains about 30 to 34% by weight water. The rough-faced vitreous material used for forming the sheet 3 was a 4 mm thick sheet of vitro-crystalline material available from Schott Glaswerke under their Trade Mark ROBAX. This material is based on the ternary system $Li_2O$—$Al_2O_3$—$SiO_2$. Its principal crystalline phase is a solid solution of $\beta$-quartz, and it contains $TiO_2$ and $ZrO_2$ as nucleating agents, each in a proportion by weight of between 0.8% and 3.0%.

The two faces of the vitro-crystalline material had a rugosity $R_{tm}$ of between 0.4 $\mu$m and 0.6 $\mu$m. The panel was manufactured by a method based on that described with reference to FIGS. 1 to 3 of British Patent Specification No 1,590,837. Layers of intumescent material were formed in situ on the two glass sheets and these were then laid up in direct contact with the two opposed faces of the vitro-crystalline sheet 3. The sandwich assembly formed in that way was then subjected to the heat and pressure schedules described in British Patent Specification No 1,590,837 in order to bond the sandwich together as a transparent laminate. The panel formed was square, measuring 50 cm on each side.

This panel may be compared with a known test panel. In this test panel, the 4 mm vitro-crystalline sheet 3 was replaced by a sheet of ordinary soda-lime glass which was 8 mm in thickness, and each of the intumescent layers was made to a thickness of 1.8 mm instead of 1 min. The panel measured 2.3 m high and 1.35 m broad. Other characteristics of the panel manufacture were the same.

The two panels were framed, each in a similar manner, and they were mounted in a furnace for testing according to International Standard No ISO 834-1975. The test was concluded after 3 hours. The results of the test were as follows.

|  | Example 1 | Test Panel |
| --- | --- | --- |
| Stability R | >180 minutes | 68 minutes |
| Integrity E | >180 minutes | 66 minutes |
| Duration I | 47 minutes | 50 minutes |

Thus the framed panel according to this Example of the invention satisfied the standard to REI level for very nearly as long as the Test Panel, but it satisfied the standard to RE level throughout the duration of the test. This represents a very significant increase in the time for which the panel was able to resist the passage of flames and fumes, despite the significantly lower mass per unit area of the panel according to this Example. Furthermore, the panel of this Example had very good infra-red radiation shielding characteristics. After 180 minutes, the panel of the Example emitted infra-red radiation at a mean rate below 15 kW/m².

In a variant of this Example, the vitro-crystalline material used for forming the sheet 3 was that available from Nippon Electric Glass under its Trade Mark FIRELITE. This material had a very similar surface rugosity to that specified earlier in this Example.

In a second variant of this Example, the panels were manufactured by a process in which the layers 2, 4 of intumescent material were formed in situ during a degassing and bonding process from grains of sodium silicate, as described in British Patent Specification No 2 023 452 in particular in Example 4 thereof, save that the size of the grains of sodium silicate was reduced and the thickness of the layers formed was again 1 mm. In a further variant, the grains used for forming the hydrated sodium silicate layers had a water content of between 23 and 25% by weight.

EXAMPLE 2 (FIG. 2)

A laminated, transparent, fire-resistant panel is manufactured in accordance with FIG. 2. We refer first to the constituent parts of the transparent, laminated, fire-resistant pane 8, which by itself constitutes a panel in accordance with this invention. The glass sheet 11 is of ordinary soda-lime glass and 3 mm in thickness. The intumescent layer 10 is of hydrated sodium silicate and 1 mm in thickness. The sodium silicate used has a weight ratio $SiO_2:Na_2O$ of 3.4:1 and contains about 30 to 34% by weight water. The vitro-crystalline material used for forming the sheet 9 was 4 mm ROBAX ® as referred to in Example 1. Prior to assembly of the panel, one face 12 of that ROBAX ® vitro-crystalline material was polished so that its surface rugosity was reduced to $R_{tm}$ of about 0.03 µm, leaving a smooth surface. The surface 13 of that sheet 9 to be placed into direct contact with the intumescent layer 10 had a rugosity $R_{tm}$ of between 0.4 µm and 0.6 µm.

Such a pane may be made by any of the methods specified in Example 1 changing what is necessary to be changed in order to arrive at the structure now specified.

The pane 8 is held in a frame (not shown) in spaced face to face relationship with respect to a single sheet of vitreous material 14. That single sheet 14 may be a sheet of ordinary soda-lime glass which is optionally tempered in order to increase its resistance to mechanical and thermal shock. Such a sheet 14 may for example be 3 mm or 4 mm in thickness. That sheet 14 may be tempered chemically or thermally, but the thinner is that sheet, the more is chemical tempering to be preferred over thermal tempering. Alternatively, that sheet 14 may be made of a glass having a low coefficient of thermal expansion such as a boro-silicate, alumino-silicate or alumino-boro-silicate glass in order to reduce its susceptibility to thermal shock, or it may be of a vitro-crystalline material. The spacing lo between the panes 8 and 14 may suitably be 10 mm to 20 mm, for example 12 mm. The inter-pane space may be fried with dry gas and sealed in a manner known per se in order to avoid condensation therein, but in such sealed embodiments, a one-way valve is provided in order to allow the escape of such dry gas as it expands under the influence of a fire.

Such a panel may be mounted with its vitro-crystalline sheet 9 between the intumescent layer 10 and any local source of ultra-violet radiation in order to postpone ageing of that layer leading to the formation of micro-bubbles therein. In thicknesses of 5 mm, ROBAX ® vitro-crystalline material has a transmissivity in respect of radiation with wavelengths between 297.5 nm and 377.5 nm of only 1.8%, so it can form a very effective shield for the intumescent material. Another suitable vitro-crystalline material for use in such a panel is sold by Nippon Electric Glass under its Trade Mark FIRELITE. That material has a transmissivity in respect of radiation with wavelengths between 297.5 nm and 377.5 nm of 12.8%. It would be usual to install such a panel with its vitro-crystalline sheet facing the sun.

A glazed assembly containing the panel of Example 2 has very effective fire-resisting properties.

A glazed assembly comprising a laminate of 4 mm ROBAX ®, 1 mm silicate and 3 mm soda-lime glass spaced 12 mm from a second glass sheets 4 mm thick may have the following properties with the second glass sheet on the fire side of the panel: REI about 15 minutes, RE about 120 minutes with some insulating effect. With the fire on the laminate side of the panel, those properties are much the same, but if the second glass sheet is chemically tempered, the framed panel retains its integrity to satisfy ISO 9051 to REI 30 minute level.

EXAMPLE 3 (FIG. 3)

A laminated, transparent, fire-resistant panel is manufactured in accordance with FIG. 3. This panel comprises two panes 8 (compare FIG. 2 and Example 2) mounted in spaced relation in a frame (not shown) back-to-back, so that the vitro-crystalline sheets 9 form the outer plies of the whole panel, thus protecting the intumescent material from the ageing effects of ultra-violet radiation from both side of the panel.

Such a pane 8 may be made by any of the methods specified in Example 1 changing what is necessary to be changed in order to arrive at the structure now specified.

A glazed assembly comprising the panel of Example 3 is extremely effective in resisting the effects of fire. A structure comprising two laminates each of 4 mm ROBAX ®, 1 mm silicate and 3 mm soda-lime glass spaced apart by 12 mm was mounted in a frame in a furnace for testing according to International Standard No ISO 834-1975. The assembly was found to satisfy ISO 9051 to REI level for 60 minutes, and it satisfied that standard to RE level for a period in excess of 4 hours after which the test was discontinued.

EXAMPLES 4 TO 9

In variants of any of the foregoing Examples, the or a rough-faced vitreous sheet 3, 9 respectively was formed of a vitro-crystalline material having the composition and properties given in the following table.

|  | % by weight | | | | | |
| --- | --- | --- | --- | --- | --- | --- |
|  | Ex. 4 | Ex. 5 | Ex. 6 | Ex. 7 | Ex. 8 | Ex. 9 |
| $SiO_2$ | 62 | 67 | 58 | 62 | 65.1 | 68.8 |
| $Al_2O_3$ | 21.2 | 21 | 28 | 22 | 22.6 | 19.2 |
| $Li_2O$ | 2.8 | 3.9 | 4.6 | 2.8 | 4.2 | 2.7 |
| $P_2O_5$ |  |  | 3.3 |  | 1.2 |  |
| $ZrO_2$ | 1.75 | 2.0 | 2.8 | 2 | 2.3 | 1.8 |
| $TiO_2$ | 1.75 | 1.75 | 1.8 | 1.8 | 2.0 | 2.7 |
| $Na_2O$ |  | 0.25 | 0.9 |  | 0.6 | 0.2 |

-continued

| | % by weight | | | | | |
|---|---|---|---|---|---|---|
| | Ex. 4 | Ex. 5 | Ex. 6 | Ex. 7 | Ex. 8 | Ex. 9 |
| $K_2O$ | 0.4 | | | | 0.3 | 0.1 |
| PbO | | | 0.6 | | | |
| MgO | 1 | | | 1.2 | 0.5 | 1.8 |
| ZnO | 6.1 | | | 6.5 | | 1.0 |
| CaO | 0.6 | 3.7 | | | | |
| BaO | 1.6 | | | 1.6 | | 0.8 |
| F | | | | | 0.1 | |
| $Fe_2O_3$ | 0.03 | | | | | 0.1 |
| $As_2O_3$ | | | | 0.6 | 1.1 | 0.8 |
| α | 1.7 | 0 (0–400° C.) | −5 | −1 | | 7 |
| PCP | solid solution β-quartz | solid solution β-quartz | solid solution β-eucryptite | solid solution β-eucryptite | solid solution β-quartz | solid solution β-quartz |

In the foregoing table, α is the mean coefficient of linear thermal expansion in $10^{-7}K^{-1}$ over the temperature range 20° to 500° C. unless otherwise indicated, and PCP is the principal crystalline phase exhibited by the respective composition.

The composition of Example 7 above was manufactured in accordance with German Patent Specification No DE 1 596 863 (Jenaer Glaswerk Schott & Gen).

EXAMPLE 10

In a further variant, the rough-faced vitreous sheet was manufactured from a boro-silicate glass having the following composition (% by weight).

| $SiO_2$ | 80.75 | ZnO | 0.006 |
|---|---|---|---|
| $B_2O_3$ | 12.72 | $Fe_2O_3$ | 0.014 |
| $Na_2O$ | 3.46 | $Al_2O_3$ | 2.187 |
| $K_2O$ | 0.52 | $TiO_2$ | 0.032 |
| CaO | 0.03 | $As_2O_3$ | 0.074 |
| MgO | 0.007 | | |

Such a boro-silicate glass has a mean coefficient of linear thermal expansion of $3.13 \times 10^{-6}K^{-1}$ over the temperature range 0° to 300° C.

What is claimed is:

1. A glazing panel which is transparent and fire-resistant, comprising:
   at least one vitreous structural ply including at least one rough-faced ply composed of vitreous material selected from the group consisting of vitro-crystalline materials and boro-silicate glass having a mean coefficient of linear thermal expansion over a temperature range of 20° C. to 300° C. which is not greater than $7.5 \times 10^{-6}K^{-1}$ and having a rough face for which roughness, $R_{tm}$, is not less than 0.1 μm; and
   at least one layer of intumescent material directly bonded to and in contact with the rough face of the at least one rough-faced ply.

2. The glazing panel according to claim 1, wherein the glazing panel includes at least two vitreous structural plies and wherein each layer of the at least one layer of intumescent material is sandwiched between and directly bonded to and in contact with two vitreous structural plies.

3. The glazing panel according to claim 2, wherein the glazing panel includes at least one vitreous structural ply composed of glass and wherein each layer of the at least one intumescent layer is sandwiched between a rough-faced ply and a glass ply.

4. The glazing panel according to claim 1, wherein the glazing panel includes at least two layers of intumescent material and wherein one rough-faced ply of the at least one rough-faced ply has two rough faces for which roughness, $R_{tm}$, is not less than 0.1 μm and is sandwiched between and directly bonded to and in contact with two layers of the at least two layers of intumescent material.

5. The glazing panel according to claim 1, wherein one rough-faced ply of the at least one rough-faced ply has an exposed face which is smooth and is exposed.

6. The glazing panel according to claim 1, wherein the at least one rough-faced ply has a mean coefficient of linear thermal expansion over a temperature range of 20° C. to 300° C. which is not greater than $3.5 \times 10^{-6}K^{-1}$.

7. The glazing panel according to claim 1, wherein the vitreous material of the at least one rough-faced ply is a vitro-crystalline material.

8. The glazing panel according to claim 7, wherein the at least one rough-faced ply has a mean coefficient of linear thermal expansion over a temperature range of 20° C. to 600° C. which is not greater than $1 \times 10^{-6}K^{-1}$.

9. The glazing panel according to claim 7, wherein the vitro-crystalline material has a principal crystalline phase which is a solid solution of β-quartz.

10. The glazing panel according to claim 7, wherein the vitro-crystalline material contains $TiO_2$ and $ZrO_2$ as nucleating agents each in a proportion by weight of from 0.8% to 3.0%.

11. The glazing panel according to claim 7, wherein the vitro-crystalline material contains alkali metal atoms, at least the greater part by number of which alkali metal atoms are lithium atoms.

12. The glazing panel according to claim 11, wherein the vitro-crystalline material is based on a ternary system composed of $Li_2O—Al_2O_3—SiO_2$.

13. The glazing panel according to claim 1, wherein the at least one intumescent material comprises hydrated sodium silicate.

14. The glazing panel according to claim 1, wherein the roughness, $R_{tm}$, ranges from 0.1 to 2.2 μm.

15. The glazing panel according to claim 1, wherein the the mean coefficient of linear thermal expansion ranges from $3.13 \times 10^{-6}K^{-1}$ to $-5 \times 10^{-7}K^{-1}$.

16. The glazing panel according to claim 1, wherein the roughness, $R_{tm}$, is 0.6 μm.

* * * * *